(12) United States Patent
Rita

(10) Patent No.: US 11,389,706 B2
(45) Date of Patent: Jul. 19, 2022

(54) STRIKING APPARATUS AND CONFIGURATIONS THEREOF

(71) Applicant: Raymond Rita, Phoenix, AZ (US)

(72) Inventor: Raymond Rita, Phoenix, AZ (US)

(73) Assignee: FIGHTER FOUNDRY LLC, Phoenix, AZ (US)

( * ) Notice: Subject to any disclaimer, the term of this patent is extended or adjusted under 35 U.S.C. 154(b) by 0 days.

(21) Appl. No.: 16/524,602

(22) Filed: Jul. 29, 2019

(65) Prior Publication Data

US 2019/0344145 A1     Nov. 14, 2019

Related U.S. Application Data

(63) Continuation-in-part of application No. 15/287,469, filed on Oct. 6, 2016, now Pat. No. 10,398,958.

(51) Int. Cl.
*A63B 69/00*     (2006.01)
*F16M 13/02*     (2006.01)

(52) U.S. Cl.
CPC .......... *A63B 69/004* (2013.01); *F16M 13/02* (2013.01); *A63B 2225/09* (2013.01); *A63B 2244/10* (2013.01)

(58) Field of Classification Search
None
See application file for complete search history.

(56) References Cited

U.S. PATENT DOCUMENTS

| | | | | |
|---|---|---|---|---|
| 695,187 | A * | 3/1902 | Whitney | A63B 69/205 482/87 |
| 1,242,626 | A * | 10/1917 | Wilson | A63B 69/205 482/87 |
| 2,677,545 | A * | 5/1954 | Ross | A63B 69/203 482/87 |
| 3,427,021 | A * | 2/1969 | Donato | A63B 69/20 482/83 |
| 3,716,232 | A * | 2/1973 | Johnson | A63B 1/005 482/40 |
| 3,813,095 | A * | 5/1974 | Long | A63B 69/205 482/87 |
| 4,050,693 | A * | 9/1977 | Lichterman | A63B 21/1627 482/87 |
| 4,309,028 | A * | 1/1982 | Finizza | A63B 69/34 248/251 |
| 4,657,242 | A * | 4/1987 | Guridi | A63B 1/005 482/40 |

(Continued)

*Primary Examiner* — Sundhara M Ganesan
*Assistant Examiner* — Shila Jalalzadeh Abyaneh
(74) *Attorney, Agent, or Firm* — Weiss & Moy, P.C.; Jeffrey D. Moy

(57) ABSTRACT

An exercise assembly has a target. At least one compression loop is coupled to the target. A rotatable member is coupled to the at least one compression loop. A support locks the rotatable member at a desired angle. At least one clamp is coupled to the support securing the exercise assembly to a building structure, wherein the at least one clamp moves in a forward and rearward direction relative to the building structure. At least one horizontal locking mechanism is coupled to the support securing the exercise assembly to the building structure, wherein the at least one horizontal locking mechanism moves in a horizontal direction relative to the building structure.

12 Claims, 8 Drawing Sheets

(56) References Cited

U.S. PATENT DOCUMENTS

| | | | | |
|---|---|---|---|---|
| 4,946,159 A * | 8/1990 | Jones | A63B 69/004 | 473/441 |
| 5,048,825 A * | 9/1991 | Kelly | A63B 21/1636 | 482/94 |
| 5,413,298 A * | 5/1995 | Perreault | A63G 9/00 | 248/228.6 |
| 5,503,606 A * | 4/1996 | Stephens | A63B 69/004 | 482/7 |
| 5,994,639 A * | 11/1999 | Johnson | H01L 35/16 | 136/236.1 |
| 7,329,210 B1 * | 2/2008 | Marano | A63B 69/004 | 482/83 |
| 7,678,028 B1 * | 3/2010 | Gore | A63B 69/201 | 482/89 |
| 8,663,073 B1 * | 3/2014 | Hays | A63B 69/20 | 482/83 |
| 9,011,297 B2 * | 4/2015 | Sagall | A63B 21/1636 | 482/87 |
| 9,358,441 B2 * | 6/2016 | Rea | A63B 69/205 | |
| 9,849,362 B2 * | 12/2017 | Nelson | A63B 71/0622 | |
| 9,868,006 B1 * | 1/2018 | Epler | A63B 21/1636 | |
| 10,076,437 B2 * | 9/2018 | Plath | A61F 5/3761 | |
| 10,293,234 B1 * | 5/2019 | Schlegel | A63B 1/00 | |
| 2002/0147061 A1 * | 10/2002 | Krause | A63B 69/345 | 473/445 |
| 2005/0003936 A1 * | 1/2005 | Schwendemann | A63B 69/004 | 482/87 |
| 2006/0276315 A1 * | 12/2006 | Krietzman | A63B 21/015 | 482/114 |
| 2007/0093362 A1 * | 4/2007 | Clayton | A63B 21/0004 | 482/88 |
| 2008/0188360 A1 * | 8/2008 | Chu | A63B 69/201 | 482/83 |
| 2011/0172068 A1 * | 7/2011 | Tyson, III | A63B 23/03541 | 482/127 |
| 2012/0065032 A1 * | 3/2012 | Jang | A63B 69/32 | 482/83 |
| 2013/0012360 A1 * | 1/2013 | Stone | A63B 23/1218 | 482/23 |
| 2013/0023387 A1 * | 1/2013 | Webb | A63B 21/1627 | 482/87 |
| 2014/0066267 A1 * | 3/2014 | Solah | A63B 69/34 | 482/83 |
| 2014/0080682 A1 * | 3/2014 | Moss | A63B 71/023 | 482/87 |
| 2014/0148314 A1 * | 5/2014 | Schlicher | A63B 69/24 | 482/87 |
| 2014/0302968 A1 * | 10/2014 | Velikin | A63B 1/00 | 482/40 |
| 2015/0011365 A1 * | 1/2015 | Nelson | A63B 21/06 | 482/84 |
| 2015/0057132 A1 * | 2/2015 | Pedone | A63B 69/34 | 482/83 |
| 2015/0352423 A1 * | 12/2015 | Almeras | A63B 69/201 | 482/89 |
| 2018/0099199 A1 * | 4/2018 | Rita | A63B 69/20 | |

* cited by examiner

STRIKING APPARATUS AND CONFIGURATIONS THEREOF

RELATED APPLICATIONS

The present application is a Continuation-In-Part (CIP) application of U.S. Patent application entitled, "Striking Apparatus and Configurations Thereof", filed Oct. 6, 2016, and having U.S. Ser. No. 15/287,469 in the name of Raymond Rita, which is incorporated herein by reference in its entirety.

TECHNICAL FIELD

This disclosure generally relates to an exercise or training device, and more particularly, to an adjustable striking apparatus that may be mounted to a door end assembly.

BACKGROUND

Athletes, or others who exercise, may enhance their workout through striking apparatuses. Boxers, kick-boxers, martial artists, or others may exercise or train through these types of apparatuses. Striking apparatuses may typically include pads or cushions that simulate the density, shape and/or weight of an opponent. One commonly used striking apparatus is constructed from leather and encases a material such as sawdust or sand. The materials, along with the encasing, may absorb hits through the user's feet, hands and/or other extremity. These hits may occur directly and/or on the sides of the striking apparatus.

Striking apparatuses may currently be supported from a ceiling, ceiling and floor, wall or portable stand. Each of these, however, has drawbacks. For example, attaching the striking apparatus to the ceiling, floor, and/or wall may use permanent embedded clasps. Because of this, the striking apparatus may be difficult to move and subjected to certain fixed locations corresponding to the clasps. Furthermore, and in portable striking apparatuses, inadequate structure may be provided that allows the apparatus to fully move unintentionally.

The present disclosure provides a striking apparatus and configurations thereof that solve the described concerns. Other benefits and advantages will become clear from the disclosure provided herein and those advantages provided above are for illustration

SUMMARY

This summary is provided to introduce a selection of concepts in a simplified form that are further described below in the DESCRIPTION OF THE DISCLOSURE. This summary is not intended to identify key features of the claimed subject matter, nor is it intended to be used as an aid in determining the scope of the claimed subject matter.

In accordance with one aspect of the present disclosure, an exercise assembly is provided. The exercise assembly has a target. At least one compression loop is coupled to the target. A rotatable member is coupled to the at least one compression loop. A support locks the rotatable member at a desired angle. At least one clamp is coupled to the support securing the exercise assembly to a building structure, wherein the at least one clamp moves in a forward and rearward direction relative to the building structure. At least one horizontal locking mechanism is coupled to the support securing the exercise assembly to the building structure, wherein the at least one horizontal locking mechanism moves in a horizontal direction relative to the building structure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein;

DESCRIPTION OF THE DISCLOSURE

The foregoing description is provided to enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

The present disclosure relates to a striking apparatus and provides multiple configurations to that apparatus. More particularly, this disclosure describes the striking apparatus having a rotatable target that may be secured on a door end assembly. In one illustrative embodiment, the target may be coupled to a rotatable member having a plurality of compression loops there between. A support may lock the rotatable member, and thus the target, at an angle through a bolt pattern spaced at forty-five (45) degree to fifteen (15) degree increments. The support may be secured to the door end assembly through at least one clamp and at least one fastener.

Numerous other modifications or configurations for the striking apparatus will become apparent from the description provided below. Advantageously, the rotatable member of the apparatus may permit a user to adjust the angle of the target allowing for different placements of the apparatus. The height of the target may also be adjusted depending on its placement on the door end assembly. The apparatus may also be sturdy allowing more forceful blows as it takes advantage of studs within the wall. The apparatus may be more easily portable than other devices. Other advantages will become apparent from the description provided below. The present disclosure will provide the components of the striking apparatus in FIGS. 1 through 3, FIGS. 4 through 6 will show different exemplary angles at which the target may be placed, FIGS. 7 and 8 will depict closer details of the apparatus, while FIGS. 9 and 10 will show another attachment mechanism.

Figure 1:
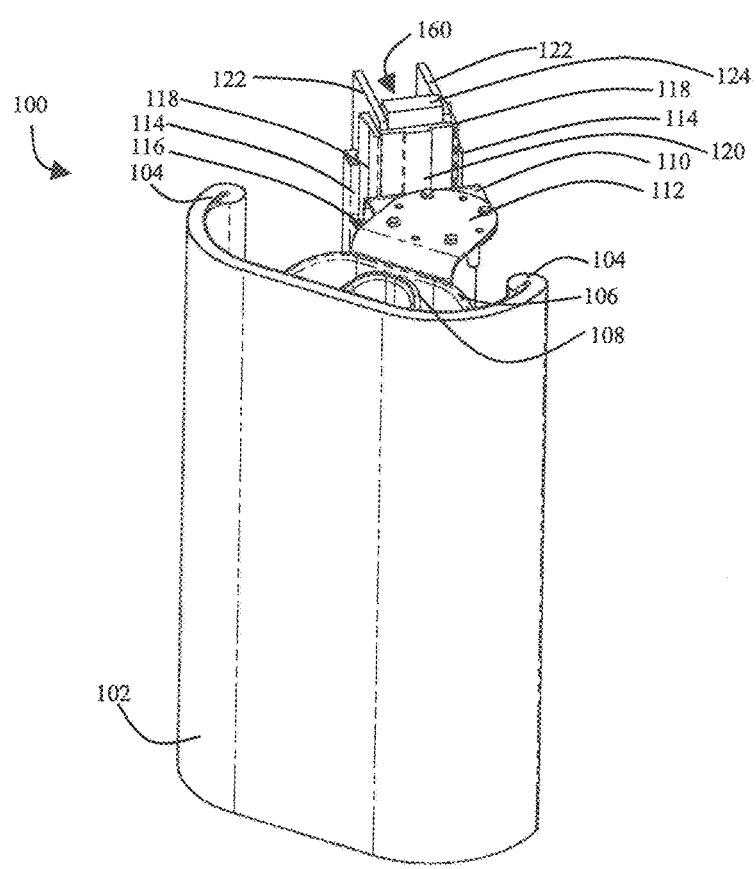
FIG. 1 is a top perspective view of an exemplary striking apparatus in accordance with one aspect of the present disclosure.

FIG. 1 is a top perspective view of an exemplary striking apparatus 100 in accordance with one aspect of the present disclosure. The striking apparatus 100 may include, but is not limited to, a target 102, outer compression loops 106 and inner compression loops 108, platforms 110, hinges 112, clamps 114 and fasteners 116. The striking apparatus 100, for purposes of this disclosure, may also be referred to as an exercise or training assembly, device or apparatus. The apparatus 100 may be placed at a number of locations where appropriate and secured by the clamps 114 and fasteners 116. Fewer or more components may be incorporated into the apparatus 100 and is not limited to those shown.

The striking apparatus 100 may be construed from a number of different materials. For example, the apparatus 100 may be made of plastic, wood, rubber, foam, metal or combinations thereof. Furthermore, components within the apparatus 100 may be made of different materials. For example, the supporting structure may be made of metal while the compression loops 106 and 108 may be made of compressed rubber. Various combinations of materials may be used.

The target 102 may also be made of materials different from the supporting structure and the compression loops 106 and 108. The outside of the target 102 may be made of, for example, leather, synthetic materials such as vinyl or canvas. Typically, this material may be selected based on its resistance to tears or cuts. Internally, the target 102 may include foam, grains, sand, rags or other materials. These materials may be encased by the leather, synthetic materials or canvas.

Various sizes and shapes of the target 102 may be provided. Different sparring, exercising or training may be enhanced or developed through the apparatus 100. This may include hits or blows from a boxer, kickboxer, and/or fighter to the target 102. Direct hits may occur to the target 102 and in addition, blows to the sides 104 of the target 102 may occur. The target 102 may be substantially elongated and folded at its sides 104 in accordance with one embodiment. The target 102 may mimic the shape of an opponent for providing a realistic experience.

In one embodiment, the target 102 may incorporate varying types of materials within different sections. For example, the middle of the target 102 may include less abrasive materials for direct shots as they are associated more typically with hand shots where the user's hands may not be protected by padding. Sides 104 of the target 102 may incorporate rigid materials. These types of materials may take on the wear and tear of the user's footwear. The target 102 may be replaceable and switched in and out with other types of targets suitable for the user.

The target 102 of the striking apparatus 100 may be coupled to a number of outer compression loops 106 and inner compression loops 108. The compression loops 106 and 108 may absorb the hits or blows from the user. The loops 106 and 108 may be welded into the back of the target 102 or fastened through other mechanism. The outer compression loops 106 may surround the inner compression loops 108. The compression loops 106 and 108 may be fastened or welded together depending on the materials used to construct them. While one set of compression loops 106 and 108 is shown, more may exist within the striking apparatus 100 which will become apparent from the disclosure provided below.

The outer compression loops 106 and inner compression loops 108 may be made of a sturdy material such, as metal or strong plastic. In one embodiment, the outer compression loops 106 and inner compression loops 108 may be made of heavy rubber. The outer compression loops 106 and inner compression loops 108 may be of the same materials or vary. For example, the outer compression loops 106 may be made of a more rigid material such as a metal and the inner compression loop 108 may be made of a more flexible material such as plastic. The outer compression loops 106 and inner compression loops 108 may provide rigidity from direct hits or side blows. As shown, the outer compression loops 106 may be oval shaped and the inner compression loops 108 may be circular to disperse the hits from the user.

Continuing with FIG. 1, the outer compression loops 106 and inner compression loops 108 may be coupled to a number of platforms 110 and hinges 112. The platforms 110 and hinges 112 may allow the target 102 to be rotated. The platforms 110 may provide a surface on which the hinges 112 may be rotated. There may be multiple platforms 110 and hinges 112 for rotating the target 102, which will become apparent from the description provided below. The platforms 110 and hinges 112 may be secured together such that the target 12 may not move or at least holds the target 102 stationary. When the user intends to rotate the target 102, for example a new exercise, the user may rotate the platforms 110 and hinges 112.

Clamps 114 and fasteners 116 may be included on the striking apparatus 100. The clamps 114 and fasteners 116 may be used to secure the apparatus 100 to the door end assembly 160. The clamps 114 may be substantially elongated and may be removably coupled to the assembly 160. The fasteners 116, which may come in a variety of forms and shapes, may be used to tie the structure of the apparatus 100 to the door end assembly 160 through the clamps 114. Through the fasteners 116, the clamps 114 may be secured, yet easily unhinged or removed such that the striking apparatus 100 may be moved or relocated to another location.

As described briefly above, the striking apparatus 100 may be secured to a door end assembly 160. The height of the striking apparatus 100, and thus the target 102, may be adjusted on the door end assembly 160. For example, taller users r ay adjust the clamps 114 of the striking apparatus 100 and secure the fasteners 116 to the assembly 160 at a higher position. The clamps 114 may be connected to the door trim 118 of the door end assembly 160. The door trim 118 may extend the entire height of the door end assembly 160 and secured into a wallboard 122.

The wallboard 122 may be secured into a stud 124, as may be provided in typical housing construction. The stud 124 may be substantially vertical and also support the door frame 120. Combined, the door end assembly 160 may provide a surface where the striking apparatus 100 may be easily coupled to and removed. The height of the striking apparatus 100 may be adjusted through the clamps 114 and fasteners 116 while the angle at which the target 102 is placed may be changed by the platforms 110 and hinges 112.

The door end assembly 160 may be found in a number of different locations. Furthermore, the apparatus 100, while depicted as being coupled to a door end assembly 160, may be also fixed to other locations where the clamps 114 and fasteners 116 may tie the apparatus 100 securely, for example, at a sturdy post such as a pole. Variations for the clamps 114 and fasteners 116 may be used to tighten the striking apparatus 100 to the pole. For example, straps or other mechanical fasteners may be used.

Figure 2:
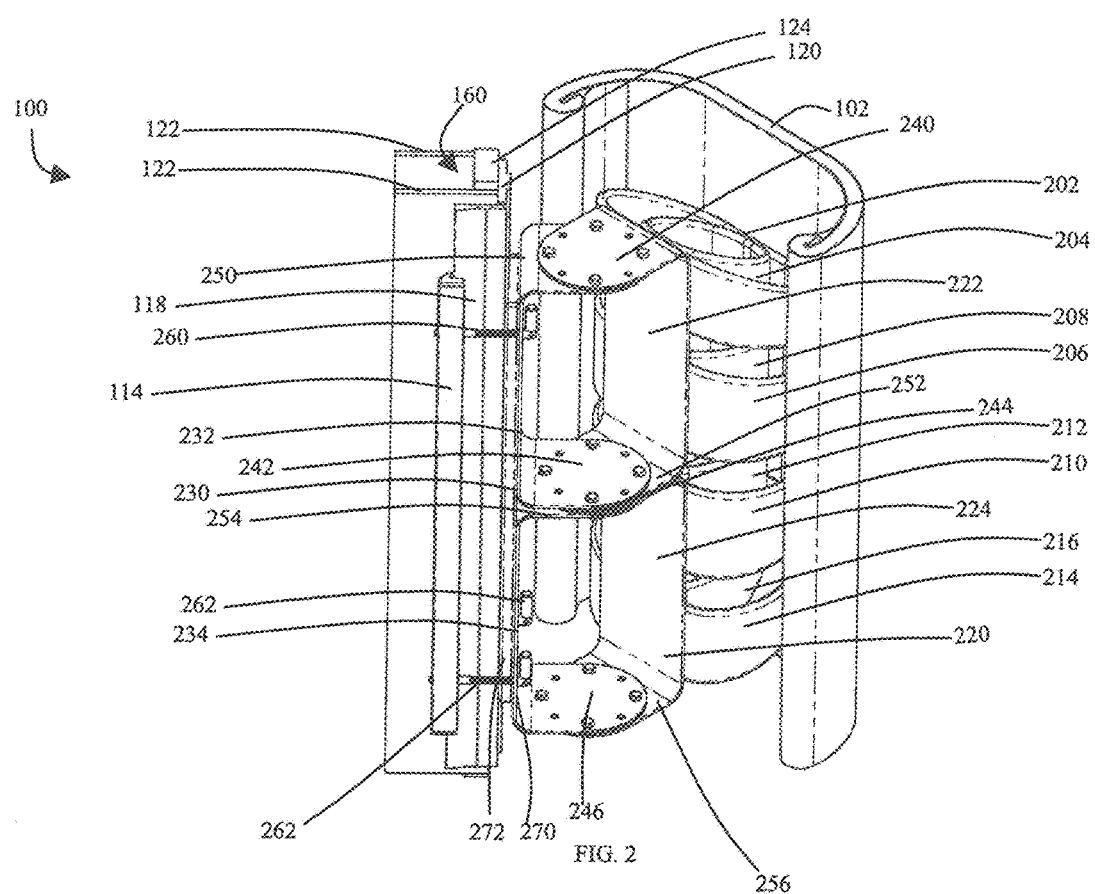
FIG. 2 is a top side view of the exemplary striking apparatus in accordance with one aspect of the present disclosure.

FIG. 2 is a top side view of the exemplary striking apparatus 100 in accordance with one aspect of the present disclosure. The outer compression loops 106 and inner compression loops 108, as described earlier, may include more than one set of loops. The striking apparatus 100 may include a first outer compression loop 202 and a first inner compression loop 204 at a top section of the target 102. A second outer compression loop 206 and second inner compression loop 208 may be formed below the first outer compression loop 202 and the first inner compression loop 204. A third outer compression loop 210 and third inner compression loop 212 may be placed below with a fourth outer compression loop 214 and fourth inner compression loop 216 below there. The number of outer compression loops 106 and inner compression loops 108 may vary in width and size and is not limited to those shown. Fewer or more compression loops 106 and 108 may also be used.

While shown as extending horizontally, the outer compression loops 106 and inner compression loops 108 may also be placed vertically, diagonally or combination thereof. In one embodiment, springs may be used instead of the compression loops 106 and 108. The target 102 may be permanently or removably coupled to the outer compression loops 106 and inner compression loops 108. Different targets 102 may be used depending on the user. Different connectors including friction fittings, locking pins, clips, snaps or hook and loop tabs may be used to secure the target 102 to the compression loops 106 and 108. In one embodiment, and as will be seen below, a panel connected to the backside of the target 102 may be fastened to the compression loops 106 and 108.

A rotatable member 220 of the striking apparatus 100 may be coupled to the outer compression loops 106 and inner compression loops 108. They may be permanently coupled or removably coupled to one another. In one embodiment, the rotatable member 220 may include a first section 222 and second section 224. The first section 222 and second section 224 may be coupled to one another or be separate pieces that make up the rotatable member 220.

The first section 222 of the rotatable member 220 may be coupled to the first outer compression loop 202 and the first inner compression loop 204 and the second outer compression loop 206 and the second inner compression loop 208. The second section 224 of the rotatable member 220 may be coupled to the third outer compression loop 210 and the third inner compression loop 212 and the fourth outer compression loop 214 and the fourth inner compression loop 216. The first section 222 and second section 224 of the rotatable member 220 may include substantially elongated pieces of material, which may be made of metal. The first section 222 and second section 224 may be permanently coupled together through welding or removably coupled through fasteners. In one embodiment, the first section 222 and second section 224 are two distinct pieces.

The rotatable member 220, through the first section 222 and second section 224, may allow the target 102 to be angled at different positions. The rotatable member 220 may be pivoted in relation to a support 230. The support 230 may include a first support member 232 and a second support member 234. In one embodiment, the first support member 232 and second support member 234 may be welded or fastened together. Alternatively, they may be two distinct pieces.

The first support member 232 of the support 230 may be pivoted in relation to the first section 222 of the rotatable member 220 while the second support member 234 may be pivoted with respect to the second section 224 of the rotatable member 220. Typically, the first support member 232 and the second support member 234 pivot at the same angle in relation to the first section 222 and second section 224 of the rotatable member 220.

The rotatable member 220 may pivot around the support 230. A number of different platforms 110 and hinges 112, described earlier, may provide the rotation. The platforms 110 may provide a surface or structure where the hinges 112 may rotate around or pivot with respect to one another. In one illustrative embodiment, the first section 222 of the rotatable member 220 may include a first hinge 240. The first hinge 240 may rotate around a first platform 250 of the first support member 232.

The first section 222 of the rotatable member 220 may also include a second platform 252. A second hinge 242 on the first support member 232 may be provided and rotated around the second platform 252 of the first section 222. The rotation may correspond with the rotation of the first hinge 240 and the first platform 250.

A third hinge 244 of the second section 224 of the rotatable member 220 may be pivoted around a third platform 254 of the second support member 234, similar to the first hinge 240 and the first platform 250. In one embodiment, the third hinge 244 may be coupled to the second platform 252 such that the first section 222 and the second section 224 of the rotatable member 220 move in tandem or together.

A fourth platform 256 may be provided on the second section 224 of the rotatable member 220. Corresponding to the fourth platform 256, a fourth binge 246 on the second support member 234 may be provided such that they may rotate with respect to one another, similar to the second platform 252 and second hinge 242. Through the pivoting of the rotatable member 220 with respect to the support 230, the target 102 may be rotated at various angles. As will be shown below, bolts and aperture patterns may allow the locking of the angle into place.

Continuing with FIG. 2, the support 230 of the striking apparatus 100 may be secured to the door end assembly 160. The apparatus 100 may be positioned at a higher or lower level depending on the user. The apparatus 100 may include a holder 270 between the support 230 and the door end assembly 160. The holder 270 may include foam rubber 272 to remove damage to the door end assembly 160 which may be caused by the support 230. Other materials may be placed between the support 230 and the assembly 160 such as plastic.

The striking apparatus 100 may include a number of fasteners 116 to secure the clamps 114 of the apparatus 100 to the door end assembly 160. A pair of top fasteners 260 and bottom fasteners 262 may be used to couple the support 230 to the door end assembly 160. Fewer or more fasteners 116 may be used. The fasteners 116 may secure the clamps 114 to the door trims 118 that are bounded into the wallboards 122. The trims 118 may provide the support for the apparatus 100. The fasteners 116 may be secured or released such that the apparatus 100 may be portable and easily affixed to the assembly 160. The apparatus 100 may take advantage of the support found in the stud 124 of the door end assembly 160. In the present embodiment, the pair of top fasteners 260 and bottom fasteners 262 move in a forward and backward direction relative to the door end assembly 160.

Figure 3:
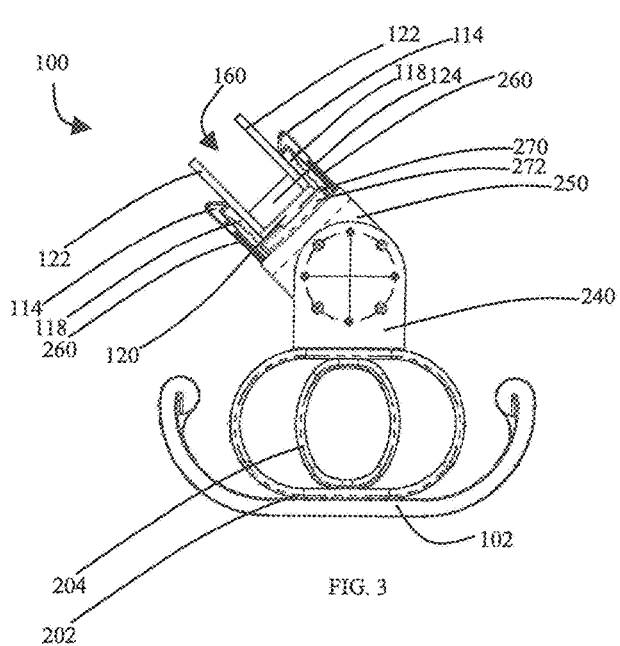
FIG. 3 is a top view of the exemplary striking apparatus in accordance with one aspect of the present disclosure.

FIG. 3 is a top view of the exemplary striking apparatus 100 in accordance with one aspect of the present disclosure. The target 102 may be coupled to the first outer compression loop 202 and first inner compression loop 204, along with other loops 106 and 108 as described earlier. The first platform 250 on the first support member 232 of the support 230 is shown pivoted with respect to the first hinge 240 of the first section 222 of the rotatable member 220.

The support 230 through the holder 270, shown from the top view and having the foam rubber 272, may be coupled to the door frame 120 of the door end assembly 160. The clamps 114 provide support for the apparatus 100 through the top fasteners 260 by fastening the apparatus 100 to the door trims 118. Once coupled, the wallboards 122 and the stud 124 provide support for the apparatus 100.

Figure 4:
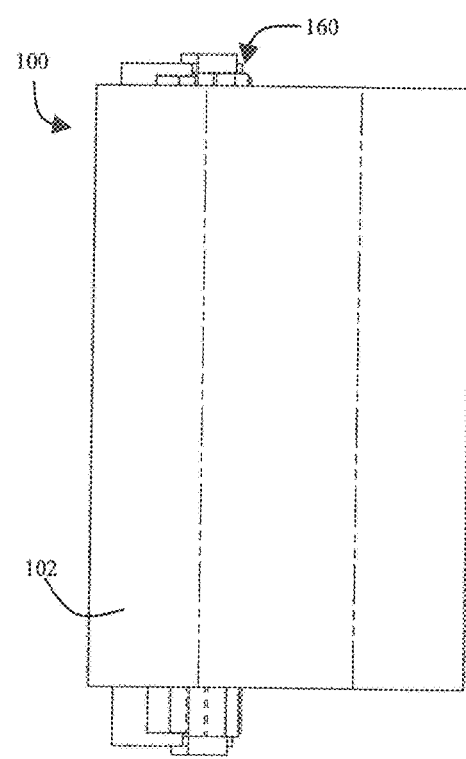
FIG. 4 is a side view of the exemplary striking apparatus showing a first position of a target in accordance with one aspect of the present disclosure.

Turning now to FIG. 4, a side view of the exemplary striking apparatus 100 showing a first position of the target 102 in accordance with one aspect of the present disclosure is provided. The padding of the target 102 may move from side-to-side on the door end assembly 160. The shown position is on a right side facing the door end assembly 160. This embodiment may allow for positioning the striking, apparatus 100 in narrow doorways.

Figure 5:
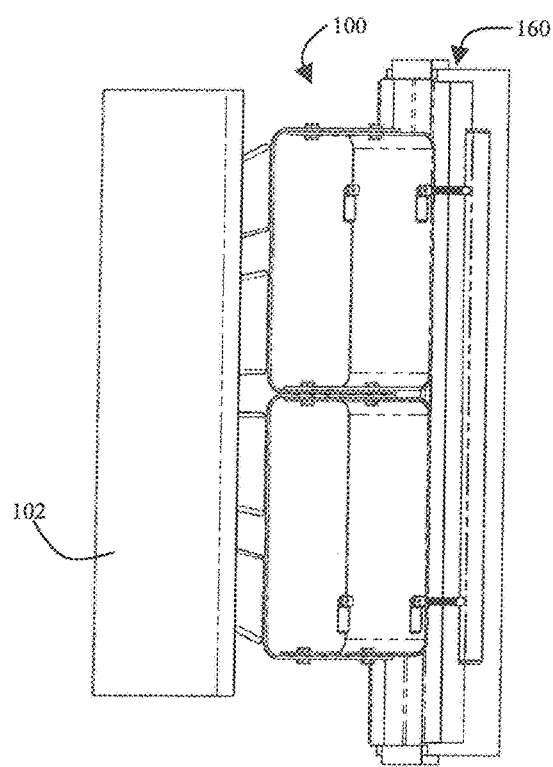
FIG. 5 is a side view of the exemplary striking apparatus showing a second position of the target in accordance with one aspect of the present disclosure.

FIG. 5 is a side view of the exemplary striking apparatus 100 showing a second position of the target 102 in accordance with one aspect of the present disclosure. This embodiment may be used where long doorways exist. The position is directly in front of the user when facing the door end assembly 160.

Figure 6:
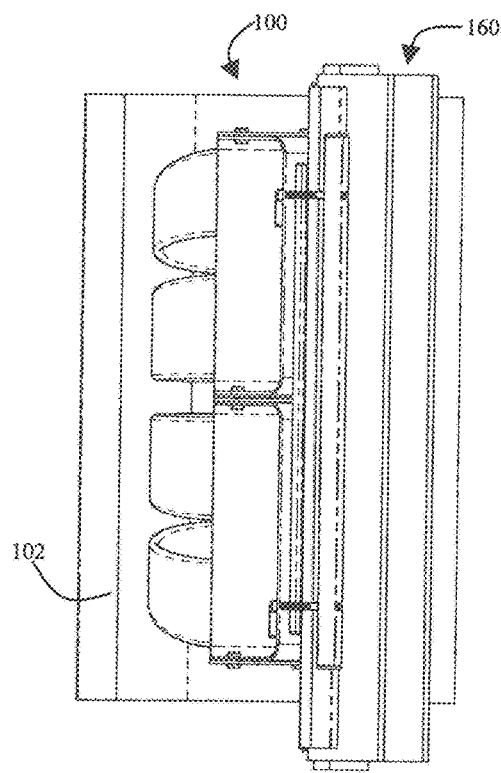
FIG. 6 is a side view of the exemplary striking apparatus showing a third position of the target in accordance with one aspect of the present disclosure.

FIG. 6 is a side view of the exemplary striking apparatus 100 showing a third position of the target 102 in accordance with one aspect of the present disclosure. More room may exist on an opposite side for placement of the target 102. The position may be on the left side facing the door end assembly 160. The striking apparatus 100 may be angled at different positions, and is not limited to those shown.

Figure 7:
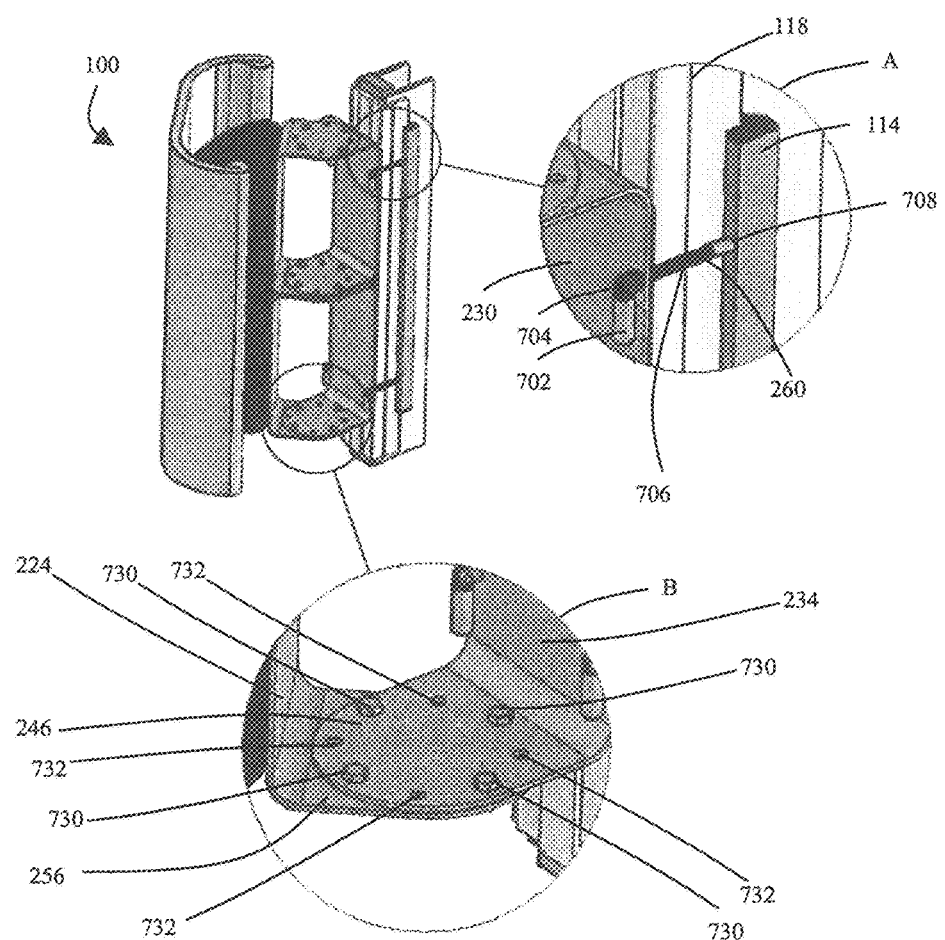
FIG. 7 is a top perspective side view of the exemplary striking apparatus showing closer views in accordance with one aspect of the present disclosure.

Referring to FIG. 7, a top perspective side view of the exemplary striking apparatus 100 showing closer views in accordance with one aspect of the present disclosure is provided. Section A provides a closer view of the top fastener 260 and clamp 114. The fastener 260 with the clamp 114 may secure the first support member 232 on support 230 to the door trim 118. This may be applied to other areas and the view shown is for illustrative purposes.

The top fastener 260, as well as the other fasteners 116, may include, but is not limited to, a knurled grip 702, pivot 704, threaded shaft 706 and threaded insert 708 locked to the shaft 706. Fewer or more components may be provided in the top fastener 260 and are not limited to those shown in Section A.

The knurled grip 704 may be placed on one side of the first support member 232 opposite the clamp 114. The grip 704 may allow the user to adjust and tighten the fastener 260. Other types of grips may be used and is not limited to such. Furthermore, other types of mechanisms may be used to tighten the fastener 260, for example, a hex nut.

The fastener 260 may include the pivot 704 allowing the user to tighten or release the fastener 260. The pivot 704 may allow the user to rotate the knurled grip 704 clockwise to tighten the connection to the door trim 118. Alternatively, rotating the knurled grip 704 counter clockwise around the pivot 704 may release the connection.

The top fastener 260 may also include the threaded shaft 706. The shaft 706 allows the tightening or releasing as the pivot 704 rotates the threading when turned. When tightened, as in rotated clockwise, the pivot 704 may rotate the shaft 706 into the threaded insert 708 thereby reducing the length of the fastener 260. The reduced length may cause the clamp 114 to be secured to the door trim 118. Oppositely, or rotated counter clockwise, the threaded shaft 706 may be extended from the threaded insert 708. Accordingly, the length of the fastener 260 may be increased and release the clamp 114 from the door trim 118.

Continuing with FIG. 7, Section B provides a closer view of the fourth hinge 246 of the second support member 234 and the fourth platform 256 of the second section 224. The fourth hinge 246 may be rotated with respect to the fourth platform 256. In the shown embodiment, these rotations may be predefined in bolt patterns. These patterns may be defined by a number of apertures 732 and bolts 730, in one embodiment, the apertures are formed every forty five (45) degrees. Thus, eight (8) apertures may be placed around the fourth hinge 246.

Bolts 730 may be placed into the apertures 732, typically, at every other aperture 732. The bolts 730 may be locked into place through the fourth platform 256. The fourth platform 256 may have inserts to lock the bolts 730 into place. While four bolts 730 are shown, more or less bolts 730 may be used to lock, the angle at which the fourth hinge 246 and fourth platform 256 are with respect to one another, and hence the angle of the target 102.

In Section B, the bolt pattern was spaced at forty five (45) degree increments. In one embodiment, the bolt pattern may be spaced at fifteen (15) degree increments. Thus, twenty four (24) apertures 732 may be provided within the fourth hinge 246 and correspondingly, twenty four inserts may provide within the fourth platform 256.

Other degree increments may be used and is not limited to those described above. Furthermore, the bolt patterns may be provided in the first hinge 240, second hinge 242 and third hinge 244. The first platform 250, second platform 252 and third platform 254 may also include the inserts for fitting the bolts 730. Different patterns may be provided in the hinges 112 and corresponding inserts into the platforms 110. Through the platforms is 110, hinges 112 and bolt patterns, the rotatable member 220 may be pivoted around the support member 230 such that a desired angle of the target 102 may be positioned and secured.

Figure 8:
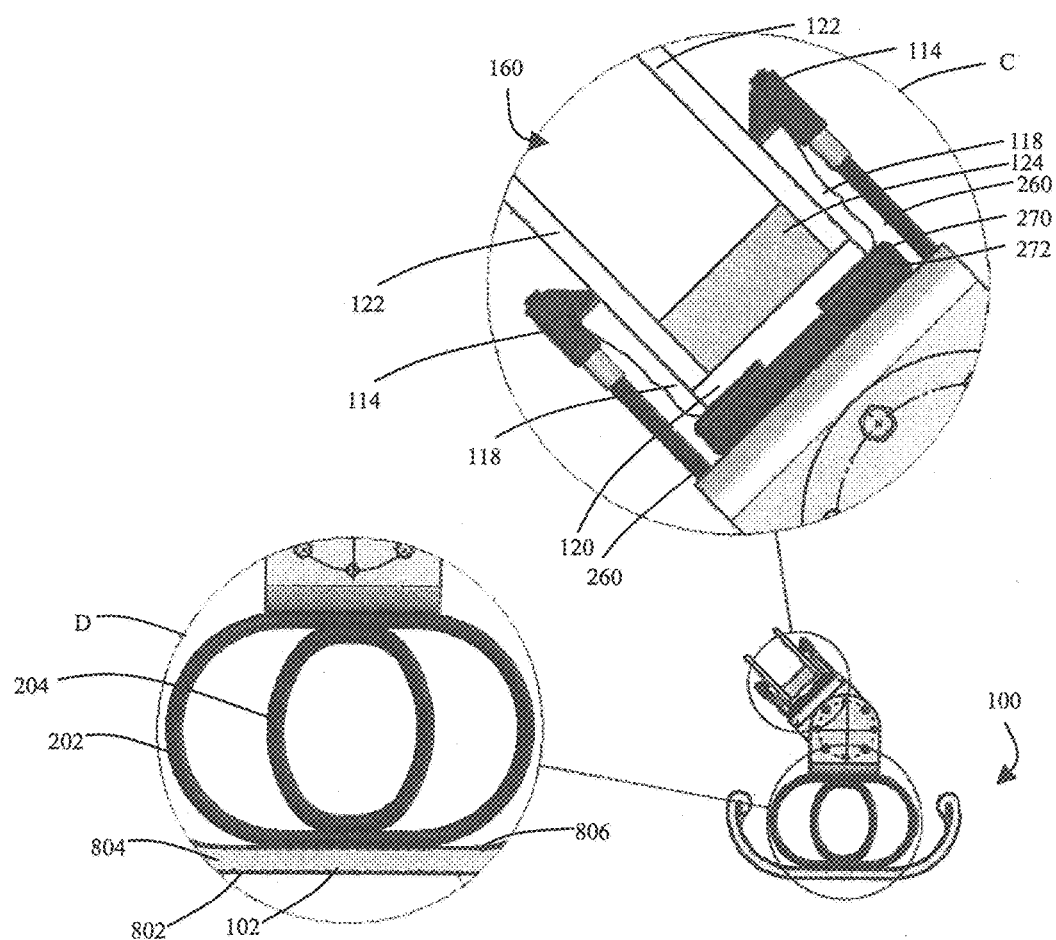
FIG. 8 is a top view of the exemplary striking apparatus showing closer views in accordance with one aspect of the present disclosure.

FIG. 8 is a top view of the exemplary striking apparatus 100 showing closer views in accordance with one aspect of the present disclosure. Section C provides a closer view of the top fasteners 260 securing the clamps 114 to the door trims 118. The clamps 114 have an angular section which may be able to grab the door trim 118. Through the fasteners 260, the apparatus 100 may be secured tightly or removed easily from the door end assembly 160. The door trim 118 may be anchored through the wallboard 122. The wallboard 122 may be secured by the stud 124.

The door stud 124 may also be coupled to the door frame 120. The door frame 120 may be fitted to the striking apparatus 100. The holder 270 with the foam rubber 272 may be secured tightly to the door frame 120 through the fasteners 260. The foam rubber 272 may protect the door frame 120. Similar features may exist for the bottom fasteners 262.

Section D provides a closer view of the first outer compression loop 202 and first inner compression loop 204. The loops 202 and 204 may pro de for rigid forming structure yet may be compressed depending on the blow or hit that the target 102 takes. As described above, a number of different outer compression loops 106 and inner compression loops 108 may be provided at different levels of the striking apparatus 100.

In addition to the compression loops 202 and 204, Section D depicts a cross-sectional area of the target 102. The target 102 may include leather 802 in the from. Other materials may be used, as described above. The leather 802 may provide a rigid but flexible material such that it does not tear or rip easily. Foam 804 may be placed underneath the leather 802. Other substances may be used. The foam 804 may receive the blows or hits. A panel 806 may also be provided on the back portion of the target 102. The panel 806 may be made of a sturdy material, for example, a metal may be used. The panel 806 may be coupled to the compression loops 202 and 204 and allow the target 102 to be replaced.

Figure 9:
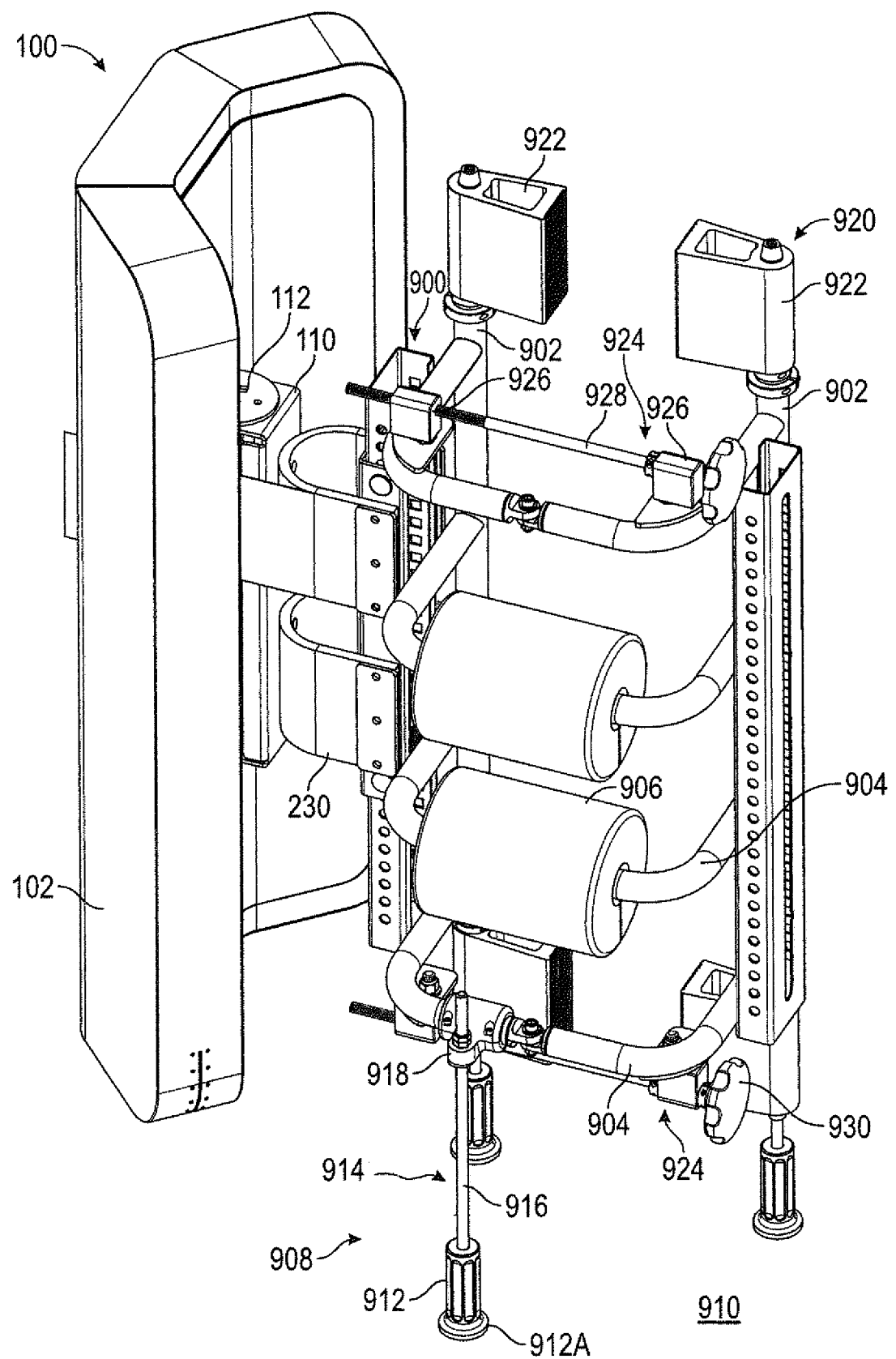
FIG. 9 is a top perspective view of an exemplary striking apparatus in accordance with one aspect of the present disclosure.
Figure 10:
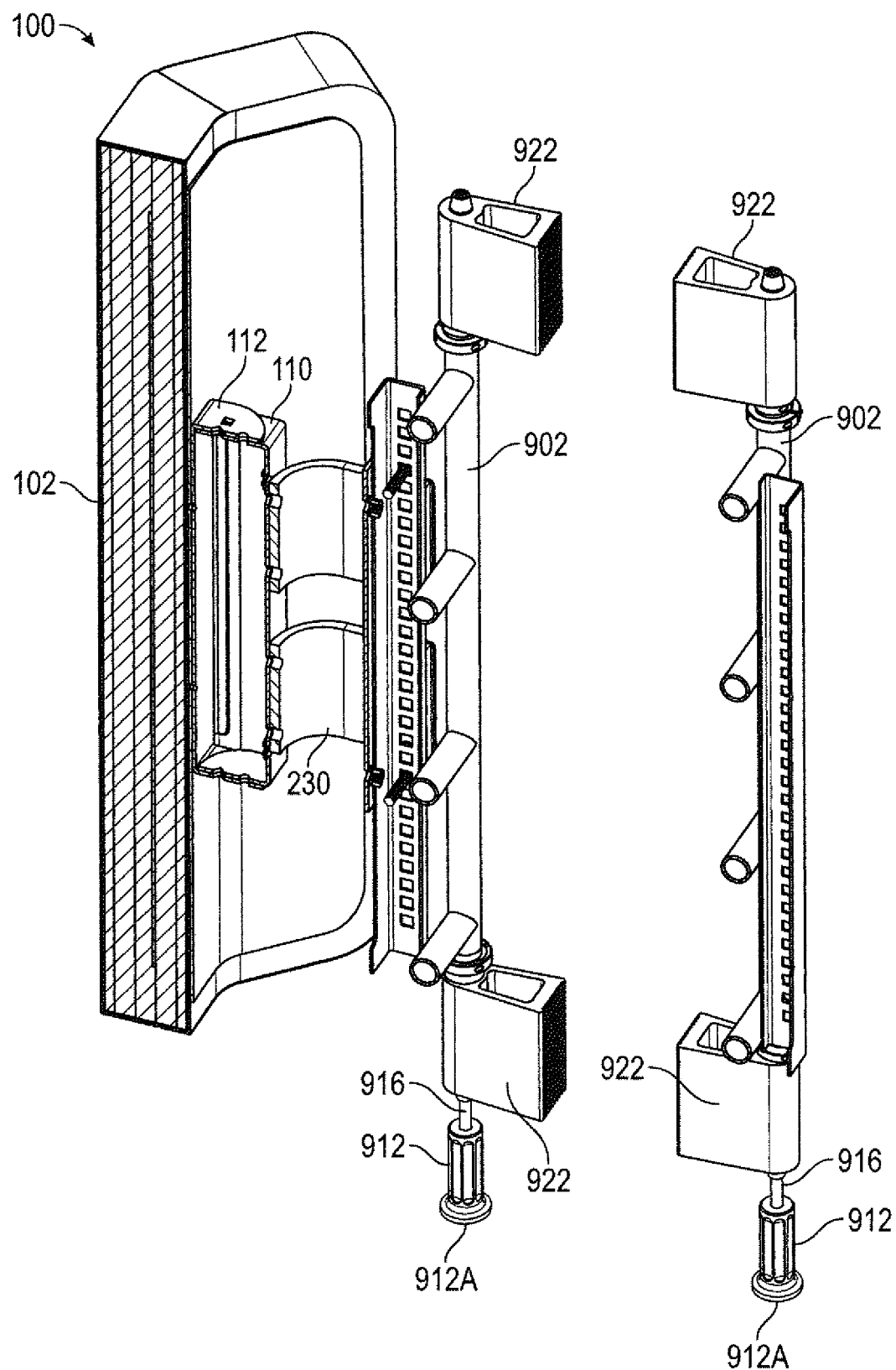
FIG. 10 is a cross-sectional view of the exemplary striking apparatus shown in FIG. 8 in accordance with one aspect of the present disclosure.

Referring to FIGS. 9 and 10 the exemplary striking apparatus 100 in accordance with one aspect of the present disclosure may be seen having additional securement and stabilization devices. The striking apparatus 100 still may include, but is not limited to, a target 102, a compression member 936, platforms 110, hinges 112, clamps 114 (FIG. 1) and fasteners 116 (FIG. 1).

In the present embodiment, the striking apparatus 100 may have a frame 900. The frame 900 may be coupled to the support 230. The frame 900 may aid in securing the striking apparatus 100 to the door end assembly 160 (FIG. 1), archway or other structure. The frame 900 may prevent movement of the striking apparatus 100 when in use. In the present embodiment, the frame 900 may be comprised of a pair of longitudinal tube members 902. One or more of the pair of longitudinal tube members 902 may be coupled to the support 230.

A plurality of "U" shape tube members 904 may be attached to the pair of longitudinal tube members 902. In the present embodiment, one end of each of the plurality of "U" shape tube members 904 may be attached to a corresponding one of the pair of longitudinal tube members 902. Padding 906 may be placed on one or more of the plurality of "U" shape tube members 904. The padding 906 may be used to prevent the frame 900 from damaging the door end assembly 160, archway or other structure which the striking apparatus 100 is secured upon.

A plurality of floor supports 908 may be coupled to a bottom section 900A of the frame 900. Each of the plurality of floor supports 908 may extend down from the bottom section 900A of the frame 900 and touch a floor area 910 proximate an area where the striking apparatus 100 is secured. The plurality of floor supports 908 may be adjustable in height. This may ensure that each of the plurality of floor supports 908 touch and engage the floor area 910 proximate an area where the striking apparatus 100 is secured.

In accordance with one embodiment, each of the plurality of floor supports 908 may have a base member 912. The base member 912 may engage the floor area 910 and prevent the striking apparatus 100 from moving while in use. A slip resistance cover 912A may be applied on a bottom area of the base member 912.

A rod 914 may be attached to a top area of the base member 912. The rod 914 may have threading 916. The threading 916 may engage threading in a connector 918 attached to the bottom section 900A of the frame 900 thereby securing the rod 914 within the connector 918. By rotating the base member 912 and or rod 914, one may adjust a height of each of the plurality of floor supports 908.

One or more horizontal locking mechanisms 920 may be coupled to the frame 900. The one or more horizontal locking mechanisms 920 may be used to secure the striking apparatus 100 to the door end assembly 160, archway or other structure which the striking apparatus 100 is secured upon. While the pair of top fasteners 260 and bottom fasteners 262 move in a forward and backward direction relative to the door end assembly 160, the horizontal locking mechanisms 920 move horizontally, i.e. left and right relative to the door end assembly 160 or other structure which the striking apparatus 100 is secured upon. In the present embodiment, two horizontal locking mechanisms 920 may be seen with one located at a top of the frame 900 and another located at the bottom of the frame 900. However, this is shown as one embodiment and more or less horizontal locking mechanisms 920 may be used.

Each of the horizontal locking mechanisms 920 may be formed of a pair of blocks 922 and an adjustment mechanism 924. Bath block of the pair of blocks 922 may be coupled to a respective one of the pair of longitudinal tube members 902. In accordance with one embodiment, each block of the pair of blocks 922 may have a slip resistant coating applied thereon.

The adjustment mechanism 924 may be coupled to the frame 900. The adjustment mechanism 924 may be used to move an open end of the frame 900 closer together or further apart. By moving the open end of the frame 900 closer together, the pair of blocks 922 move horizontally inwards towards one another thereby securing the pair of blocks 922 to the door end assembly 160, archway or other structure which the striking apparatus 100 is secured upon. By moving the open end of the frame 900 apart, the pair of blocks 922 move horizontally outwards away from one another thereby releasing the pair of blocks 922 to the door end assembly 160, archway or other structure which the striking apparatus 100 is secured upon.

In the present embodiment, the adjustment mechanism 924 may be formed of a pair of locking nuts 926 and a threaded bar member 928. One of the pair of locking nuts 926 may be posited on each side of a corresponding "U" shape tube members 904. The threaded bar member 928 may engage the pair of locking nuts 926. Rotating the threaded bar member 928 in a first direction compresses the open end of the "U" shape tube members 904 together securing the pair of blocks 922 to the door end assembly 160, archway or other structure which the striking apparatus 100 is secured upon. Rotating the threaded bar member 928 in a second and opposite direction releases the open end of the "U" shape tube members 904 causing the pair of blocks 922 to release from the door end assembly 160, archway or other structure which the striking apparatus 100 is secured upon. A knob 930 may be attached to one end of the threaded bar member 928. The knob 930 may be used to rotate the threaded bar member 928 in the first and section directions.

The foregoing description is provided to, enable any person skilled in the relevant art to practice the various embodiments described herein. Various modifications to these embodiments will be readily apparent to those skilled in the relevant art, and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that a known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An exercise assembly comprising:
   a target;
   a compression member coupled to the target;
   a rotatable member coupled to the compression member rotating the target to a desired angle;
   a support coupled to the rotatable member;
   a frame coupled to the support, wherein the frame comprises:
      a pair of longitudinal tube members coupled to the support; and
      a plurality of "U" shaped tube members coupled to the pair of longitudinal tube members; and
   at least one horizontal locking mechanism coupled to the frame securing the exercise assembly to a building structure, wherein the at least one horizontal locking mechanism moves in a horizontal direction relative to the building structure.

2. The exercise assembly of claim 1, wherein the at least one horizontal locking mechanism comprises:
   a pair of blocks coupled to the frame; and
   an adjustment mechanism moving the pair of blocks in the horizontal direction relative to the building structure.

3. The exercise assembly of claim 2; wherein the adjustment mechanism comprises:
   pair of locking nuts coupled to the frame; and
   threaded bar member engaging the pair of locking nuts, wherein rotating the threaded bar member in a first direction compresses the frame moving the pair of blocks inwards and rotating the threaded bar member in a second direction releases the frame and moves the pair of blocks outwards.

4. The exercise assembly of claim 3, wherein the adjustment mechanism comprises a knob attached to one end of the threaded bar member.

5. The exercise assembly of claim 1, comprising a plurality of adjustable floor supports coupled to a bottom area of the frame.

6. The exercise assembly of claim 5, wherein each of the plurality of adjustable floor supports comprises:
   a base member;
   a rod attached to a top area of the base member, wherein the rod has threading formed thereon;
   a connector attached to the bottom of the frame, wherein the threading on the rod engages with threading on the connector to secure the rod to the connector.

7. The exercise assembly of claim 1, comprising a plurality of floor supports coupled to a bottom area of the frame.

8. The exercise assembly of claim 1, comprising padding attached to at least one of the plurality of "U" shaped tube members.

9. An exercise assembly comprising:
   target;
   a compression member coupled to the target;
   a rotatable member coupled to the compression member rotating the target to a desired angle;
   a support coupled to the rotatable member;
   a frame coupled to the support, wherein the frame comprises:
      a pair of longitudinal tube members coupled to the support; and
      a plurality of "U" shaped tube members coupled to the pair of longitudinal tube members;
   at least one horizontal locking mechanism coupled to the frame securing the exercise assembly to a building structure, wherein the at least one horizontal locking mechanism moves in a horizontal direction relative to the building structure; and
   a plurality of adjustable floor supports coupled to a bottom area of the frame.

10. The exercise assembly of claim 9, wherein the at least one horizontal locking mechanism comprises;
    a pair of blocks, wherein each of the pair of blocks is couple to a corresponding longitudinal tube member of the pair of longitudinal tube members; and
    an adjustment mechanism coupled to one of the plurality of "U" shaped tube members, the adjustment mechanism moving the pair of blocks in the horizontal direction inward and outward relative to the building structure.

11. The exercise assembly of claim 10, wherein the adjustment mechanism comprises:
    a pair of locking nuts coupled to the one of the plurality of "U" shaped tube members; and
    a threaded bar member engaging the pair of locking nuts, wherein rotating the threaded bar member in a first direction compresses the frame moving the pair of blocks inwards and rotating the threaded bar member in a second direction releases the frame and moves the pair of blocks outwards.

12. The exercise assembly of claim 9, wherein each of the plurality of adjustable floor supports comprises:
    a base member;
    a rod attached to a top area of the base member, wherein the rod has threading formed thereon;
    a connector attached to the bottom of the frame, wherein the threading on the rod engages with threading on the connector to secure the rod to the connector.

* * * * *